D. B. GIBBONS.
VEHICLE SHAFT ATTACHMENT.
APPLICATION FILED NOV. 10, 1914.
1,141,791. Patented June 1, 1915.
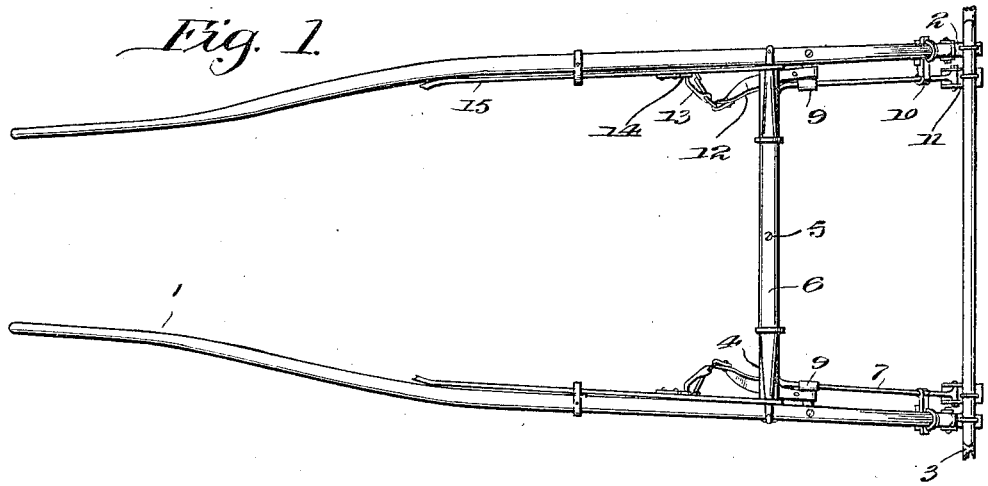
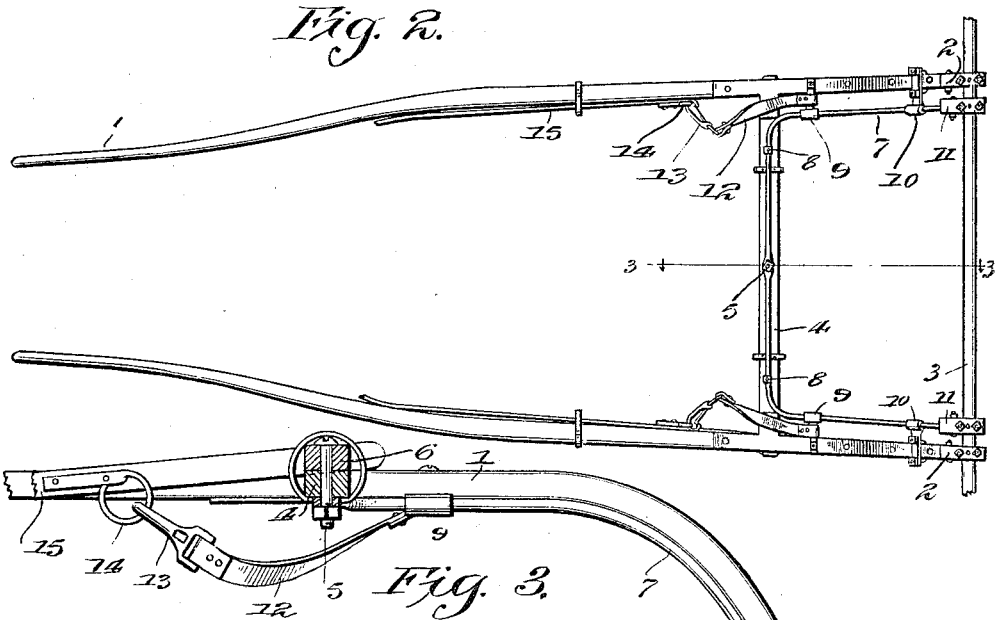
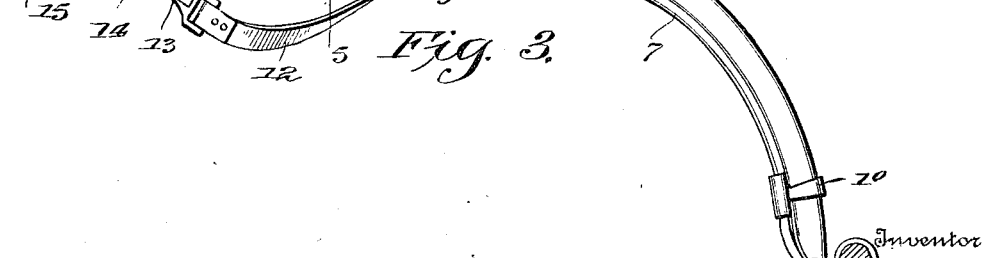
Witnesses
Frederick P. Moran
C. Edmondson Jr.
Inventor
D. B. Gibbons
By Victor J. Evans
Attorney

UNITED STATES PATENT OFFICE.

DEVILLO B. GIBBONS, OF HERMON, NEW YORK.

VEHICLE SHAFT ATTACHMENT.

1,141,791.   Specification of Letters Patent.   Patented June 1, 1915.

Application filed November 10, 1914.   Serial No. 871,358.

*To all whom it may concern:*

Be it known that I, DEVILLO B. GIBBONS, a citizen of the United States, residing at Hermon, in the county of St. Lawrence and State of New York, have invented new and useful Improvements in Vehicle Shaft Attachments, of which the following is a specification.

This invention relates to vehicle shaft attachments and the principal object of the invention is to provide simple and efficient means which may be readily attached to the shafts and axle of the vehicle and which will obviate accidents caused from the shafts becoming detached from the buggy and falling on the heels of the horse, the eyes of the shafts breaking out or the clip giving away, the cross bar breaking or the swingletree breaking, by the bolt connecting the swingletree to the cross bar giving away or by the tugs breaking or slipping from the swingletree.

Further objects of the invention will appear as the following description is read in connection with the accompanying drawing, which forms a part of this application, and in which:—

Figure 1 is a top plan view. Fig. 2 is a bottom plan view. Fig. 3 is a detail longitudinal section taken on the line 3—3 of Fig. 2.

Referring more particularly to the drawing, 1 represents a pair of ordinary carriage or buggy shafts which are connected by the clips 2 with the front axle 3, as is usual, and are joined together by the ordinary cross bar 4 to which is pivoted by means of the bolt 5 a swingletree 6 of any suitable design.

The shafts are bowed from the cross bar back to the axle, as is customary, and secured to the axle and the cross bar is the yoke shaped attachment generally indicated at 7 and having the connecting portion between its legs extending parallel with and lying upon the underside of the cross bar 4, being joined thereto by the bolts 8 and the pivot bolt 5. The legs of this yoke-shaped attachment are arranged parallel with the bowed portion of the shafts and are connected to said bowed portions by the laterally extending arms 9 and 10. The inner ends or terminals of said legs are connected directly to the axle 3 by means of the clips 11. Secured to the arms 9 and extending forwardly of the cross bar are flexible connectors in the form of straps 12 which carry snap hooks 13 upon their outer ends to engage the eye members 14 secured to the traces 15. By employing an attachment of this character it will be seen that should the traces slip from the swingletree or the eyes in the traces pull out that the strain would be supported entirely upon the connectors 11. If the cross bar or swingletree should break the strain would be taken up by the connectors and by the yoke-shaped member 7 connected directly to the front axle.

What is claimed is:—

1. An attachment for shafts comprising a yoke-shaped member connecting the axle and the cross bar, arms connecting the yoke-shaped member with the shafts, and means connecting the arms with the traces.

2. An attachment for vehicle shafts comprising a yoke-shaped member having its connecting portion secured beneath the cross bar of said shafts and its terminals connected to the axle of the vehicle, arms connecting the attachment with the shafts, and flexible members connected to the arms and having means for securing them to the traces.

3. A vehicle attachment comprising a yoke-shaped member having its connecting portion secured beneath the cross bar of the shafts and its terminals connected to the axle of the vehicle, of arms connecting the attachment to the shafts and holding said attachment away from the bowed portion thereof, straps connected to said arms, eye members adapted to be attached to the traces and snap connectors for joining the straps and the eye members.

In testimony whereof I affix my signature in presence of two witnesses.

DEVILLO B. GIBBONS.

Witnesses:
  M. L. KNOX,
  W. E. BESWICK.

Copies of this patent may be obtained for five cents each, by addressing the "Commissioner of Patents, Washington, D. C."